United States Patent [19]
Balmer

[11] Patent Number: 5,267,696
[45] Date of Patent: Dec. 7, 1993

[54] AGRICULTURAL VEHICLE CONVERTIBLE TO BROADCAST LIQUID OR DRY AGRICULTURAL MATERIALS

[76] Inventor: Charles Balmer, Box 34, Elie, Manitoba, Canada, R0H 0H0

[21] Appl. No.: 943,243

[22] Filed: Sep. 10, 1992

[51] Int. Cl.$^5$ ............................................. A01C 15/00
[52] U.S. Cl. ................................. 239/662; 239/663; 239/674; 239/676; 239/689; 239/172
[58] Field of Search ............... 239/663, 172, 662, 674, 239/676, 689

[56] References Cited

U.S. PATENT DOCUMENTS

| | | | |
|---|---|---|---|
| 2,924,040 | 2/1960 | White et al. | 239/663 |
| 3,401,890 | 5/1965 | Middlesworth | 239/663 |
| 4,234,109 | 11/1980 | Goodhart | 239/663 X |
| 4,511,284 | 4/1985 | Sterner | 239/663 X |
| 4,949,906 | 8/1990 | Godwin | 239/663 |
| 5,052,627 | 10/1991 | Balmer | 239/655 |

Primary Examiner—Andres Kashnikow
Assistant Examiner—Lesley D. Morris
Attorney, Agent, or Firm—Adrian D. Battison; Stanley G. Ade; Murray E. Thrift

[57] ABSTRACT

An agricultural vehicle is convertible to a first mode for broadcasting liquid agricultural material and to a second mode for broadcasting dry agricultural material. The vehicle includes a single main tank which is used in the first mode to transport liquid and in the second mode to transport dry material. The tank converges to an apex at the base and an auger is positioned within the tank extending upwardly from the apex to emerge from the tank at the top of the front wall. When filled with liquid, the auger is plugged at its discharge end allowing the auger tube to be filled with the liquid. When working in the second mode, the plug is opened and the auger extracts the dry material from the main tank and deposits it onto a pair of conveyor chains each forming a curtain of material which divides into separate receptacles for transportation to separate material supply tubes of a pair of booms extending outward to each side of the vehicle. Each boom also carries the liquid supply duct to which spray nozzles are attached. Supplementary tanks are provided for dry material on either side of the distribution system whose metering role is for adding the dry material to the supply tubes of the booms. Additional liquid tank forms a rear part of the tank structure for supplementing the dry material in the dry mode.

20 Claims, 3 Drawing Sheets

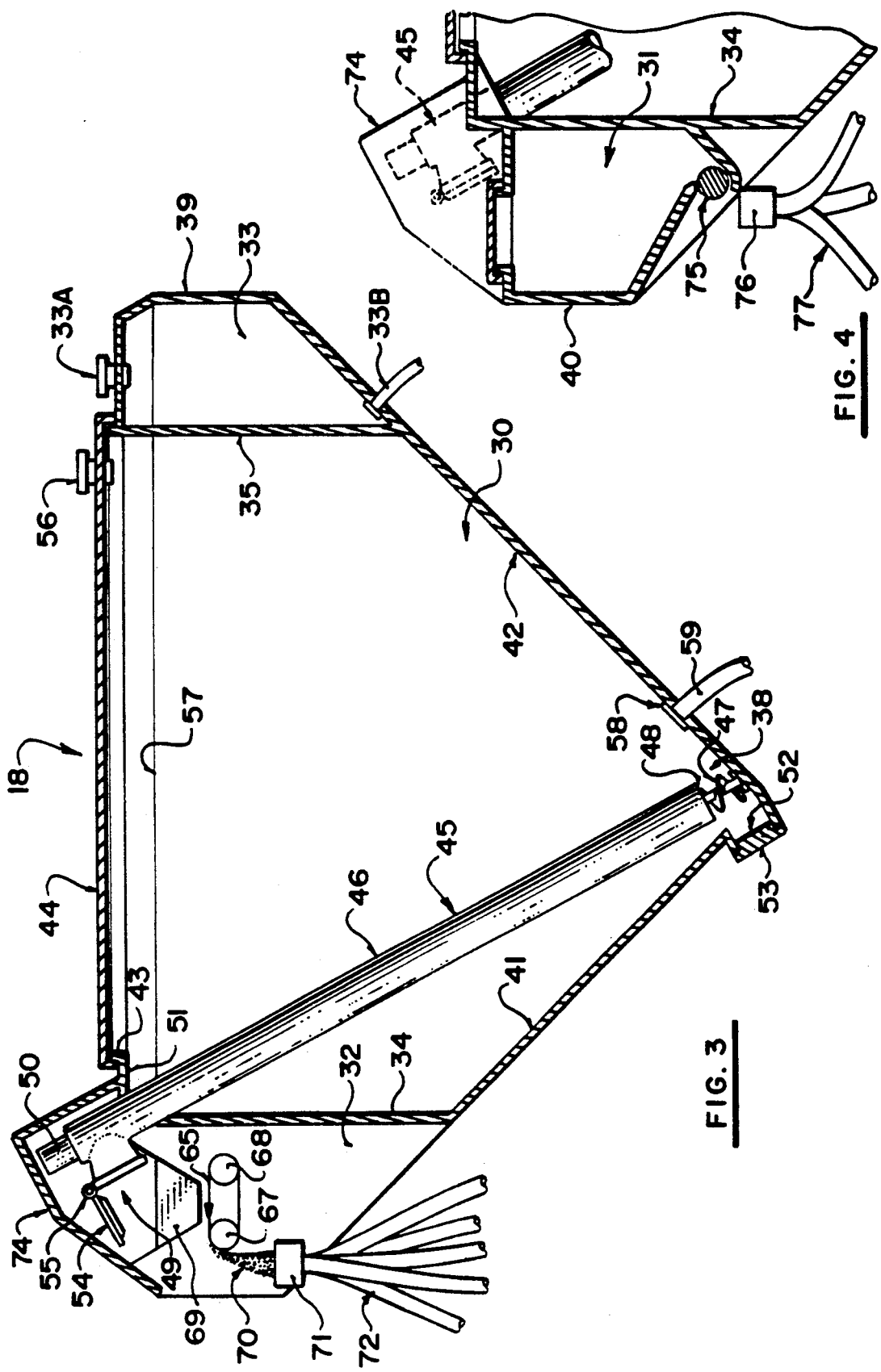

AGRICULTURAL VEHICLE CONVERTIBLE TO BROADCAST LIQUID OR DRY AGRICULTURAL MATERIALS

This invention relates to an agricultural vehicle which is convertible to a first mode for broadcasting over the ground liquid agricultural material and to a second mode for broadcasting over the ground dry agricultural material.

The requirement for broadcasting dry agricultural material such as fertilizer and other chemicals is of course well known and many designs of machine have been manufactured and proposed for carrying out this function. One example is shown in U.S. Pat. No. 5,052,627 of the present inventor. Another example is shown in a brochure of Tyler of Benson, Minn. entitled "Fluid air precision placement". Other examples are shown in a brochure of Ag-Chem Equipment Co. Inc. of Minnetonka, Minn. Some machines of this type use a simple spinner at the rear of the machine onto which the material is dropped to be spread randomly by the rotation of the spinning disc. Other designs use a boom including a plurality of material transportation tubes in which the material is transported pneumatically along the tubes and then spread by a nozzle at the outer end of the tube.

The requirement for agricultural spraying of various liquid chemicals is also of course well known and again many designs of sprayer have been manufactured and proposed and generally all of these including booms which extend outwardly to each side of the central frame with a liquid supply duct extending along the booms and having nozzles at spaced positions along the length of the duct.

It has been well known that it is desirable to attempt to provide a vehicle which can be converted from spreading of dry or particulate materials to a liquid spreading of broadcasting system. In the above brochure of Ag-Chem, there is provided a vehicle which can be converted from one system to the other but generally only complex disassembly of the vehicle and removal of a dry spreader assembly and replacement by a liquid spreading assembly.

The advantage of providing a conversion system is of course solely one of costs since the common parts involved, that is mainly the vehicle structure, are supplied in a single vehicle which is used for both purposes. This advantage in cost however cannot be outweighed by the difficulties of conversion and the expense of the additional parts if the product is expected to be commercially successful. It is highly desirable, to provide a common vehicle which can be used for transportation in spreading of both liquid and of dry material with minimum conversion, time and difficulty.

One example of a device of this type is shown in U.S. Pat. No. 4,234,109 (Goodhart) which discloses a single tank with a horizontal auger running along the bottom of the tank and a shroud positioned over the auger. The shroud can be used to control the amount of material feeding to the auger and can in addition be clamped down to the bottom of the tank to provide a seal by which the tank can be used for containing a liquid for spraying with other liquid escaping through the auger system.

The patent also mentions in the preamble an earlier U.S. Pat. No. 3,401,890 (Middlesworth) which is stated to provide a dual capability but has the apparent disadvantages of a limited load capacity. A dual set up requires an investment into two virtually complete yet separate arrangements. Both tanks must therefore be transported at all times even when only one of the systems is being used. This adds dead weight which seriously interferes with the efficiency of the system.

The Goodhart patent uses a simple spinner as the spreading system arranged at the rear of the horizontal auger. The shroud system which involves an elongate shroud member along the whole of the base of the tank is very difficult to seal due to its length and due to any distortion which may occur in the tank or the shroud during use. The system therefore has not apparently achieved significant commercial exploitation.

It is one object of the present invention, therefore, to provide an improved agricultural vehicle which can be used in the first and second modes as described above while enabling a simple and rapid conversion from one mode to the other.

According to the invention, therefore, there is provided an agricultural vehicle which is convertible to a first mode for broadcasting over the ground liquid agricultural material and to a second mode for broadcasting over the ground a dry agricultural material comprising a vehicle frame, ground wheels mounted on the frame for movement of the frame across the ground, first broadcast means carried by the frame for broadcasting dry agricultural material, second broadcast means carried by the frame for broadcasting liquid agricultural material, a tank convertible to receive separately both the liquid agricultural material and the dry agricultural material, the tank comprising tank walls defining a hollow interior converging toward a material confining area at a base of the tank, and defining an open top through which the dry material can be loaded, a cover lid for closing the open top, an auger for transporting the dry material from the tank to the first broadcast means including an auger tube and an auger flight mounted within the tube for rotation relative thereto, the auger tube having an open mouth at one end thereof for receiving the material from the tank and a discharge opening at an opposed end thereof for discharging the material to the first broadcast means, a pump having an inlet duct connected to the tank for extracting the liquid therefrom and an outlet duct connected to the second broadcast means, the auger tube being mounted so as to extend from the open mouth at the base of the tank upwardly such that the discharge opening is raised to a height above the inlet open mouth at one side of the tank and sealing means for plugging one end of the auger tube when used in the first mode to prevent escape of liquid material from the tank through the auger tube, the sealing means being movable such that in the second mode it allows discharge of the dry material through the auger tube.

One embodiment of the invention will now be described in conjunction with the accompanying drawings in which

BRIEF DESCRIPTION OF THE DRAWINGS

FIG. 3 is a cross sectional view along lines 3—3 of FIG. 2.

FIG. 4 is a cross sectional view along the lines 4—4 of FIG. 2.

DETAILED DESCRIPTION

Figure 1:
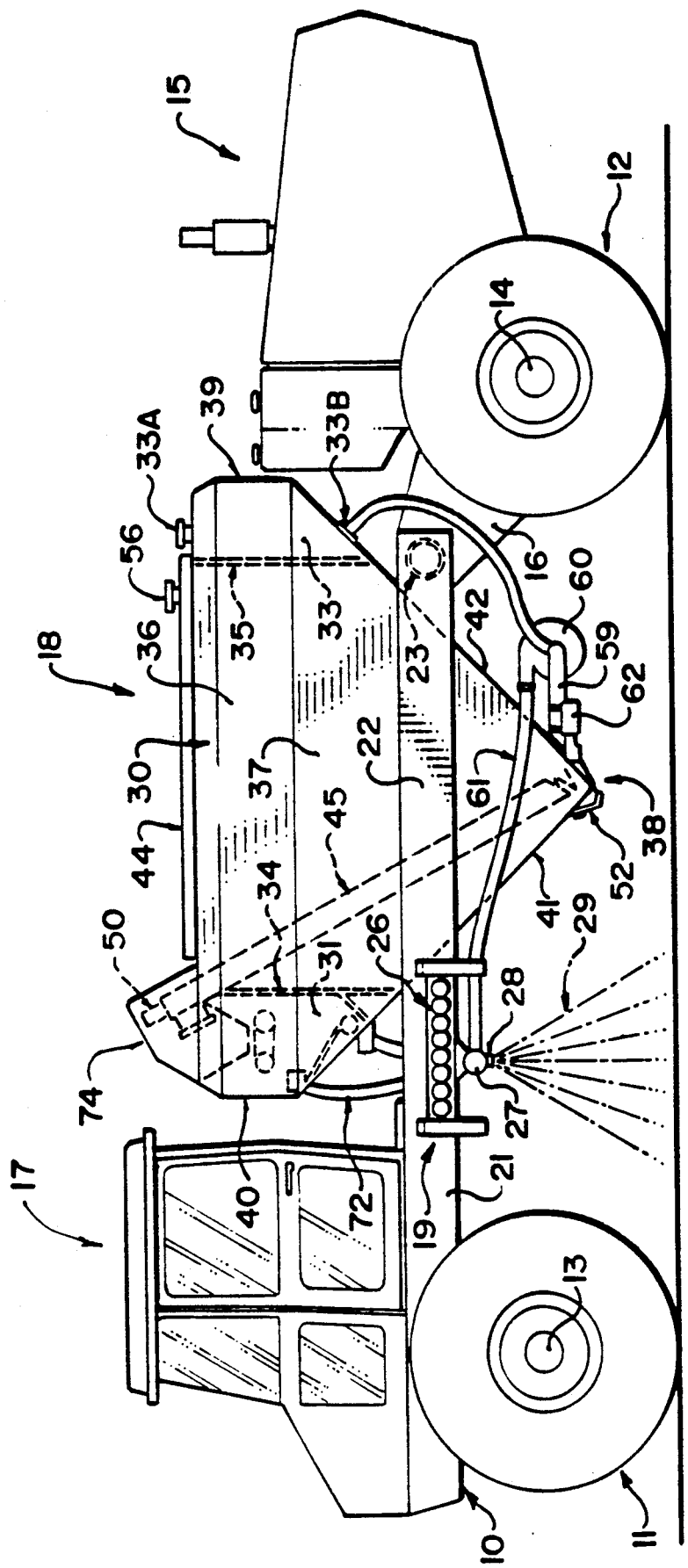
FIG. 1 is a side elevational view of a vehicle according to the present invention.

The vehicle comprises a vehicle frame generally indicated at 10 mounted on ground wheels schematically indicated at 11 and 12 supporting the frame on axles 13 and 14. An engine 15 is mounted on the frame at the rear end above the rear wheels 12 on a frame section 16. A cab 17 is mounted on the frame 10 at a forward end.

In the center section of the frame 10 is mounted a tank 18 arranged for transportation of both liquid and dry materials as described in more detail hereinafter. Between the tank and cab is provided a pair of booms 19 and 20 which project out to a respective side of the vehicle.

The frame 10 includes the rear frame section 16, a front frame section 21 supporting the cab and the central frame section 22 carrying the tank 18. The central frame section comprises a pair of beams which extend along the sides of the tank outside the tank and supporting the tank by engagement therewith. A cross beam 23 extends at the rear of the side beams and connects the side beams to the rear frame section 16. A further cross beam 24 connects the side beams at the front end of the tank and the cross beam 24 is connected to the front frame section 21. The frame sections are formed from beams and plates in a manner which is well known to one skilled in the art.

Each of the booms 19 and 20 comprises a plurality of individual material supply tubes 26 arranged in a common horizontal plane and extending in parallel side by side relationship. The details of the tubes are not shown as these will be again be apparent to one skilled in the art and one example is shown in the prior U.S. Pat. No. 5,052,627 of the present inventor. At the end of each tube is provided a spreader nozzle. The tubes are varied in length so that the spreader nozzles are staggered along the length of the boom to provide a spread pattern across the full width of the machine. The supporting structure for the boom and its folding arrangement is not shown since it again will be apparent to one skilled in the art. In addition each boom includes a liquid supply duct 27 mounted on an underside of the boom and supported by the structural members of the boom. The liquid supply duct includes a plurality of nozzles 28 at spaced positions along the length of the supply duct for generating a spray pattern 29 spraying the material toward the ground.

The tank 18 comprises a main tank structure 30 together with three supplementary tank elements 31, 32 and 33. The main tank structure 30 includes a vertical front wall 34 and a vertical rear wall 35. The front wall 34 divides the main tank element from the front two supplementary tank element 31 and 32 positioned forwardly thereof. The third supplementary tank element 33 is positioned cross the full width of the main tank structure 30 rearwardly of the rear wall 35.

The tank 18 includes vertical side walls 36 each of which forms a side wall for the supplementary tank elements 31, 32, for the main tank structure 30 and the rear supplementary tank element 33 as best shown in FIG. 1. From that vertical side wall 36, there is provided a hopper bottom side wall 37 which is inclined downwardly and inwardly toward a base 38 of the tank 18 which comprises an apex for converging the material to the apex at the base. The tank 18 further includes a vertical front wall 40 and a vertical rear wall 39 which form the front and rear respectively of the supplementary tank elements 31, 32 and for element 33. From those vertical walls there is provided downwardly and inwardly inclined wall portions 41 and 42 which again converge to the apex at the base 38.

The main tank structure 30 includes an open top 43 which is covered by a hydraulically actuated cover lid 44 which can be moved to an open position exposing the open top 43 for filling of the main tank structure 30 with the particulate material or can be closed hydraulically to provide a sealed cover for the opening 43 to prevent escape of liquid which may splash or slosh as the vehicles moves.

An auger 45 is mounted within the tank and includes an auger tube 46 and an auger flight mounted within the tube for rotation relative to the axis of the tube to feed material from an open mouth 48 of the tube at the lower end to a discharge opening 49 at the upper end of the tube. The flight is driven by a hydraulic motor 50. The open mouth 48 of the tube is arranged adjacent the apex at the base 38 so that a short portion of the auger flight 47 is exposed at the apex of the main tank structure 30 for picking up the particulate material as it converges to the apex at the base 38 to draw that material along the auger tube. The tube extends upwardly and forwardly from the apex to exit the main tank structure 30 adjacent the forwardmost corner thereof between the front wall 34 and a top wall 51 within which the opening 43 is provided. The periphery of the tube 46 is welded or otherwise sealed to the adjacent portions of the wall 34 and the top wall 51 so the main tank structure is fully closed. At the bottom of the main tank structure 30 is provided a discharge opening 52 closed by a plug 53 which can be removed or opened to allow remaining material to be discharged from the bottom of the main tank structure 30. At the discharge opening 49 of the auger is provided a plug member 54 which is shown in the open position in FIG. 3 but which can be moved into a closed plugging position by pivotal movement about an upper axis 55. Closure of the plug member 54 can be actuated hydraulically. Alternatively the closure member may be entirely separate from the discharge opening and can be attached thereto manually by a clamping system for example of the type known as a "banjo coupling".

When the main tank structure 30 is used in the first mode, that is the distribution of liquid materials, the plug member 54 is moved into position closing the upper end of the auger. All dry material is extracted from the main tank structure by opening of the plug 53 and reversal of the hydraulic motor 50. The tank is then filled after closure of the plug 53, through an opening 56 with the liquid. As the main tank structure 30 is fully closed by the plug 53, the plug member 54 and sealed by the welded walls, there is no possibility of leakage from main tank structure 30 or from the auger since the auger is a closed tube up to and beyond the top of the tank. The plug member 54 simply acts to prevent escape of any liquid that splashes from the top of the tube. The auger tube of course fills with liquid up to the liquid level 57 adjacent the top of the main tank structure.

In this mode, liquid is drawn from an exit opening 58 adjacent to but spaced from the apex 38 through a pump inlet duct 59 to a pump 60 and from the pump to a pressurized outlet duct 61 leading to the boom supply duct 27. During this time, therefore, the vehicle acts as a sprayer distributing solely liquid material from the nozzles 28 of the boom onto the ground.

The positioning of the boom immediately rearwardly of the cab allows the operator to readily view all of the nozzles to ensure that they are operating properly.

The positioning of the outlet opening 58 in the tank at a position just above the apex at the base ensures that liquid is drawn from a position close to the front of the tank but spaced from the bottom so that any remaining dry material in the tank can fall to the bottom of the tank and not interfere with the withdrawal of the liquid through the opening 58. Suitable filters 62 can be positioned in the inlet supply line 59 to the pump to ensure that dry material does not enter and clog the nozzles 28.

When it is desired to convert the system into the second mode that is the distribution of dry material, the liquid is released from the tank through the opening 52 and the plug 53 closed. The cover lid 44 can then be opened and the dry material discharged into the tank. The plug 54 is then opened or removed allowing the tank to be used for discharge of the dry material through the auger into the broadcasting system supplying the booms 19 and 20.

In general terms the broadcasting system is of the type shown in the above U.S. Pat. No. 5,052,627 of the present inventor. Thus the discharge opening 49 of the auger discharged onto a pair of conveyor chains 65 and 66 each positioned on a respective side of the discharge opening 49 at a position below the discharge opening to receive the material therefrom. The conveyor chains lie in a common horizontal plane and move forwardly towards the tab. The conveyor chains are of the type disclosed in the above previous patent but are only short in that they are carried on front and rear rollers 67 and 68 just in front of and just behind respectively the discharge opening 49. A chute arrangement 69 directs the material outwardly from the center onto the conveyor chains 65, 66 in a substantially smooth or level layer. If necessary additional levelling elements may be provided to simulate the gate structure of the above patent. This arrangement therefore provides a constant layer across the width of the conveyor chain and this layer is discharged from the discharge end of the conveyor chain in the curtain of the material indicated at 70. The curtain of material falls downwardly into a plurality of receptacles 71 arranged in a row across the width of the tank. Each receptacle therefore receives a metered portion of the dry material discharged from the layer on the conveyor chain and this material is then communicated from the receptacles through a respective one of plurality of conveying tubes 72 to a respective one of the material transport tubes 26.

Figure 2:
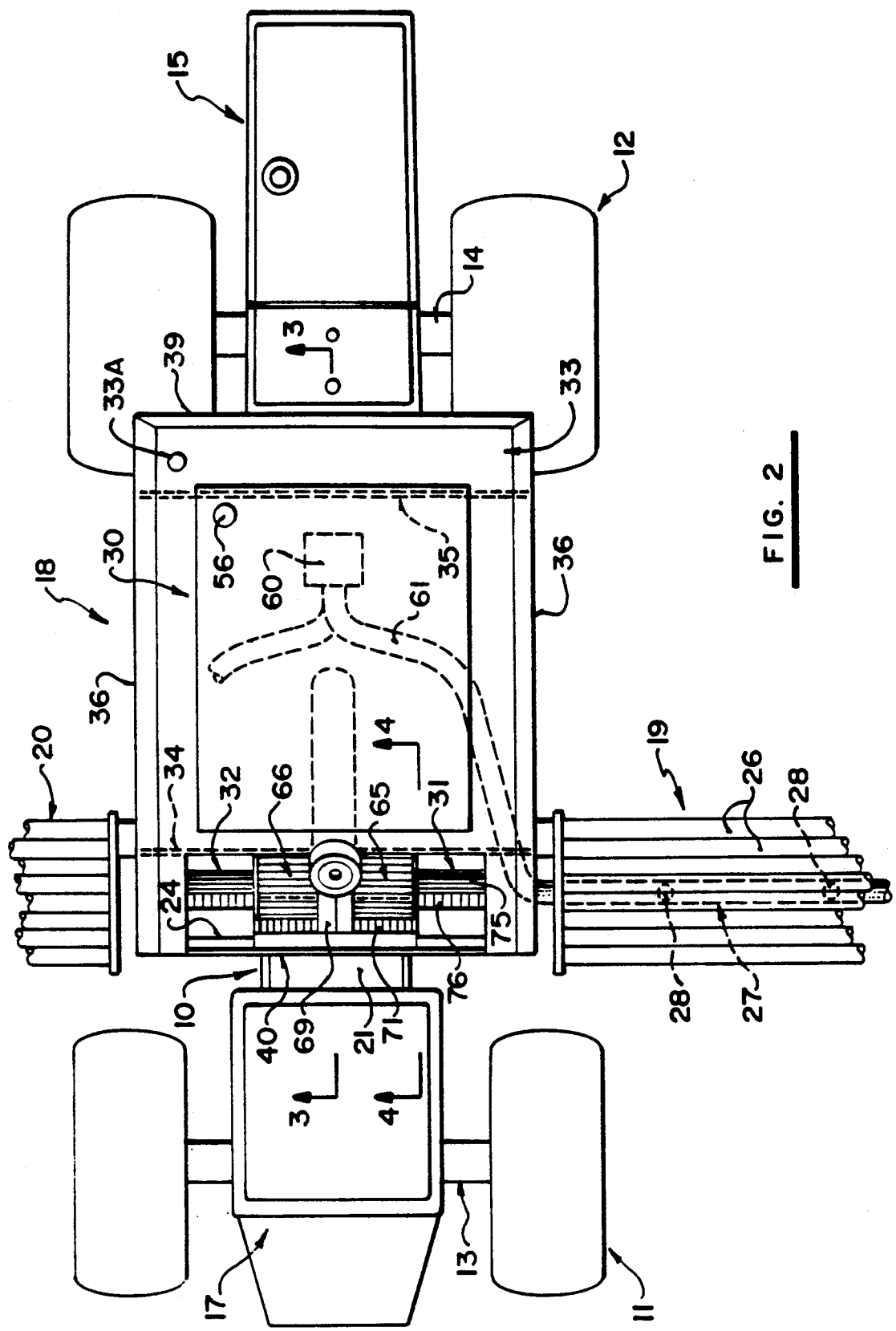
FIG. 2 is a top plan of the vehicle of FIG. 1.

As shown in FIG. 2, the conveyor chain 65, 66 and the associated receptacles 71 are positioned between the two front supplementary tank elements 31 and 32. The receptacles 71 are positioned immediately behind the cab so they can be readily viewed by the operator when turning his head to inspect the receptacle between the tanks 31 and 32. The top of the auger 45 and the chute 69 are covered by a shroud 74 (it is omitted from FIG. 2) for protection from the elements. The shroud however terminates at a front edge above the conveyor chain so that the operation of the conveyor chains and the receptacles is readily visible.

Each of the front supplementary tank elements 31 and 32 is arranged to receive a dry agricultural material for distribution. The supplementary tank element is relatively narrow since it is located between the metering system for the materials in the main tank and the outside wall of the tank structure. The supplementary tank element includes a metering roller 75 at its bottom outlet, the metering roller in the structure of the bottom half of the tank element being well known to one skilled in the art of the type manufactured for many years by Valmar Air Flow of Elie, Manitoba, Canada. The metering roller 75 discharged into a plurality of receptacles 76 which again communicate through tubes 77 to each of the material transport tubes 26 of a respective one of the booms. Each transport tube includes a venturi (not shown) for drawing the material from the tubes 72 and 77 into the material transport tube together with a fan system for generating pneumatic air flow along the tubes for transporting the material to the discharge nozzles at the end.

In the dry distribution mode, therefore, the main distribution material from the main tank structure 30 is carried through the auger 45 and a supplementary material can be added into the system from the supplementary tank elements 31 and 32.

In addition in the dry distribution mode, an additional liquid can be added to the ground from the supplementary tank element 33, the tank element being filled through an opening 33A and discharged through an outlet duct 33B passing to the pump 60. The liquid material is therefore passed through the liquid discharge ducts 27 of the booms to be sprayed to the ground simultaneously with the spreading to the ground of the dry material from the main tank structure 30.

The use therefore of a plugging system which acts to plug the end of the inclined auger enables the main structure tank to be converted immediately and with little physical effort from the liquid discharge system to the dry discharge system and vice versa.

The positioning of the boom bottom between the cab and the tank together with the location of the metering systems at the front of the tank enable the operator to readily view the operation of the metering systems both of the main structure tank and the supplementary tank elements to ensure that none of the ducts become plugged.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An agricultural vehicle which is convertible to a first mode for broadcasting over the ground a liquid agricultural material and to a second mode for broadcasting over the ground a dry agricultural material comprising a vehicle frame, ground wheels mounted on the frame for movement of the frame across the ground, first broadcast means carried by the frame for broadcasting dry agricultural material, second broadcast means carried by the frame for broadcasting liquid agricultural material, a tank convertible to receive separately both the liquid agricultural material and the dry agricultural material, the tank comprising tank walls defining a hollow interior converging toward a material confining area at a base of the tank, and defining an open top through which the dry material can be loaded, a cover lid for closing the open top, an auger for transporting the dry material from the tank to the first broadcast means including an auger tube and an auger flight mounted within the tube for rotation relative thereto, the auger tube having an open mouth at one end thereof for receiving the material from the tank and a discharge opening at an opposed end thereof for discharging the material to the first broadcast means, a pump having an inlet duct connected to the tank for extracting the liquid therefrom and an outlet duct connected to the second broadcast means, the auger tube being mounted so as to extend from the open mouth at the base of the tank upwardly such that the discharge opening is raised to a height above the inlet open mouth at one side of the tank and sealing means for plugging one end of the auger tube when used in the first mode to prevent escape of liquid material from the tank through the auger tube, the sealing means being movable such that in the second mode it allows discharge of the dry material through the auger tube.

2. The vehicle according to claim 1 wherein the sealing means is arranged to plug the discharge opening such that in the second mode the auger tube is filled with the liquid.

3. The vehicle according to claim 1 wherein the discharge opening is arranged at a height substantially equal to the top of the tank.

4. The vehicle according to claim 1 wherein the auger tube is mounted inside the tank and wherein the tank walls converge to an apex at the base of the tank with the open mouth of the auger tube arranged adjacent the apex.

5. The vehicle according to claim 4 including a discharge opening at the base of the tank.

6. The vehicle according to claim 4 wherein the inlet duct of the pump is connected to the tank at a position spaced upwardly from the apex.

7. The vehicle according to claim 1 wherein the first broadcast means includes a first boom extending outwardly to one side of the frame, a second boom extending outwardly to an opposed side of the frame each of the booms including a plurality of material transportation tubes and means for metering the material from the discharge opening of the auger tube into each of the material tubes and wherein the second broadcast means comprises liquid duct means extending along each of the booms and including a plurality of spray nozzles at spaced positions therealong.

8. The vehicle according to claim 7 wherein the vehicle frame includes a cab mounted at a forward end of the frame and wherein the booms are positioned on the frame at a position rearwardly of the cab and forwardly of the tank.

9. The vehicle according to claim 8 including an engine for propelling the vehicle mounted on the frame rearwardly of the tank.

10. The vehicle according to claim 7 wherein the first broadcast means includes a conveyor chain mounted above the booms outside the tank at a position just underneath the discharge opening and arranged to transport the material from the discharge opening to a discharge end of the conveyor chain so as to release the material from a discharge end of the conveyor chain in a curtain of the material and including a plurality of a receptacles arranged in a row along the curtain of material such that each receptacle receives a portion of the curtain for transportation to a respective one of the material tubes.

11. The vehicle according to claim 10 including two separate conveyor chains arranged in a common horizontal plane in parallel spaced relation, each conveyor chain forming a separate curtain of the material and including a plurality of separate receptacles, the receptacles of each conveyor chain being associated with a respective one of the booms.

12. The vehicle according to claim 7 wherein the material tubes of each boom are arranged in a common horizontal plane.

13. The vehicle according to claim 7 including a first supplementary element for receiving dry agricultural material, the first supplementary tank element having a metering roller at a base of the first supplementary tank element for metering dry material from the first supplementary tank element into each of the material tubes.

14. The vehicle according to claim 13 wherein the first supplementary tank element is associated with a respective one of the booms and there is provided a second supplementary tank element associated with the other of the booms, said second supplementary tank element including a metering roller arranged symmetrically relative to the metering roller of the first supplementary tank element relative to a center line of a vehicle.

15. The vihicle according to claim 14 wherein the first and second supplementary tank elements are arranged at a top of said tank with the auger tube mounted therebetween along a center line of the vehicle, the metering rollers being arranged with a common axis of rotation lying transversely to the center line of the vehicle.

16. The vehicle according to claim 7 including an additional tank element for receiving liquid agricultural material, the pump including a second inlet duct connected to said additional liquid tank element and arranged for spraying of liquid when said vehicle is operating in the second mode.

17. An agricultural vehicle which is convertible to a first mode for broadcasting over the ground a liquid agricultural material and to a second mode for broadcasting over the ground a dry agricultural material comprising a vehicle frame, ground wheels mounted on the frame for movement of the frame across the ground, first broadcast means carried by the frame for broadcasting dry agricultural material, second broadcast means carried by the frame for broadcasting liquid agricultural material, a tank convertible to receive separately both the liquid agricultural material and the dry agricultural material, the tank comprising tank walls defining a hollow interior converging toward a material confining area at a base of the tank, and defining an open top through which the dry material can be loaded, a cover lid for closing the open top, an auger for transporting the dry material from the tank to the first broadcast means including an auger tube and an auger flight mounted within the tube for rotation relative thereto, the auger tube having an open mouth at one end thereof for receiving the material from the tank and a discharge opening at an opposed end thereof for discharging the material to the first broadcast means, a pump having an inlet duct connected to the tank for extracting the liquid therefrom and an outlet duct connected to the second broadcast means, and sealing means for plugging the auger tube at the discharge opening end when used in the first mode to prevent escape of liquid material from the tank through the auger tube, the sealing means being movable such that in a the second mode it allows discharge of the dry material through the auger tube.

18. The vehicle according to claim 17 including a discharge opening at the base of the tank.

19. The vehicle according to claim 17 wherein the inlet duct of the pump is connected to the tank at a position spaced upwardly from the apex.

20. An agricultural vehicle which is convertible to a first mode for broadcasting over the ground a liquid agricultural material and to a second mode for broadcasting over the ground a dry agricultural material comprising a vehicle frame, ground wheels mounted on the frame for movement of the frame across the ground, first broadcast means carried by the frame for broadcasting dry agricultural material, second broadcast means carried by the frame for broadcasting liquid agricultural material, a tank convertible to receive separately both the liquid agricultural material and the dry agricultural material, the tank comprising tank walls defining a hollow interior converging toward a material confining area at a base of the tank, and defining an open top through which the dry material can be loaded, a cover lid for closing the open top, an auger for transporting the dry material from the tank to the first broadcast means including an auger tube and an auger flight mounted within the tube for rotation relative thereto, the auger tube having an open mouth at one end thereof for receiving the material from the tank and a discharge opening at an opposed end thereof for discharging the material to the first broadcast means, a pump having an inlet duct connected to the tank for extracting the liquid therefrom and an outlet duct connected to the second broadcast means, and sealing means for plugging one end of the auger tube when used in the first mode to prevent escape of liquid material from the tank through the auger tube, the sealing means being movable such that in a second mode it allows discharge of the dry material through the auger tube, wherein the first broadcast means includes a first boom extending outwardly to one side of the frame, a second boom extending outwardly to an opposed side of the frame each of the booms including a plurality of material transportation tubes and means for metering the material from the discharge opening of the auger tube into each of the material tubes, wherein the second broadcast means comprises liquid duct means extending along each of the booms and including a plurality of spray nozzles at spaced positions therealong, wherein the vehicle frame includes a cab mounted at a forward end of the frame and wherein the booms are positioned on the frame at a position rearwardly of the cab and forwardly of the tank.

* * * * *